(12) United States Patent
Suzuki et al.

(10) Patent No.: US 9,112,233 B2
(45) Date of Patent: Aug. 18, 2015

(54) CELL AND METHOD FOR MANUFACTURING THE SAME, METHOD AND APPARATUS FOR MANUFACTURING CELL CORE, AND CELL CORE

(75) Inventors: Isao Suzuki, Kyoto (JP); Noriyoshi Munenaga, Kyoto (JP); Taku Nakamura, Kyoto (JP); Hiroshi Tasai, Kyoto (JP); Shun Ito, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1001 days.

(21) Appl. No.: 13/146,781

(22) PCT Filed: Jan. 28, 2010

(86) PCT No.: PCT/JP2010/051089
§ 371 (c)(1),
(2), (4) Date: Jul. 28, 2011

(87) PCT Pub. No.: WO2010/087384
PCT Pub. Date: Aug. 5, 2010

(65) Prior Publication Data
US 2011/0287293 A1    Nov. 24, 2011

(30) Foreign Application Priority Data
Jan. 29, 2009  (JP) ................................ 2009-017894

(51) Int. Cl.
*H01M 6/02* (2006.01)
*H01M 6/10* (2006.01)
*H01M 10/04* (2006.01)

(52) U.S. Cl.
CPC ...... *H01M 10/0431* (2013.01); *H01M 10/0409* (2013.01); *Y10T 29/49108* (2015.01); *Y10T 29/53135* (2015.01)

(58) Field of Classification Search
CPC ......... H01M 6/02; H01M 6/04; H01M 10/04; H01M 10/0409
USPC .................................... 429/94; 29/623.1, 730
See application file for complete search history.

(56) References Cited

U.S. PATENT DOCUMENTS 6,485,859 B1    11/2002  Szyszkowski

FOREIGN PATENT DOCUMENTS

| JP | 62195860 A | 8/1987 |
| JP | 5170360 A | 7/1993 |
| JP | 6168736 A | 6/1994 |
| JP | 1064589 A | 3/1998 |

(Continued)

*Primary Examiner* — Karie O'Neill Apicella
(74) *Attorney, Agent, or Firm* — The Webb Law Firm (57) ABSTRACT

Disclosed is a method for manufacturing a cell which includes: a first step of manufacturing a core using a core manufacturing apparatus, the apparatus including a pair of winding shafts disposed with a rotation center of the apparatus interposed therebetween, the pair of winding shafts orbitally moving about the rotation center; and a second step of fabricating a laminated electrode member with a sheet-shaped positive electrode, a sheet-shaped negative electrode and a pair of sheet-shaped separators interposed thereto to be arranged alternately with the electrodes; and winding the laminated electrode member around a circumferential surface of the core. The first step includes: inserting a sheet having a higher strength than the separators between the winding shafts; orbitally moving the pair of winding shafts; and adhesively bonding or melt-bonding overlapped portions of the sheet at the winding shafts.

8 Claims, 11 Drawing Sheets

(56) References Cited

FOREIGN PATENT DOCUMENTS

| JP | 10270069 A | 10/1998 |
| JP | 2000156241 A | 6/2000 |
| JP | 2000340263 A | 12/2000 |
| JP | 2001126769 A | 5/2001 |
| JP | 2001229974 A | 8/2001 |
| JP | 2003242970 A * | 8/2003 | .............. H01M 4/04 |
| JP | 2003249257 A | 9/2003 |
| JP | 2003346880 A | 12/2003 |
| JP | 2007207649 A | 8/2007 |
| JP | 2009252425 A | 10/2009 |

* cited by examiner

CELL AND METHOD FOR MANUFACTURING THE SAME, METHOD AND APPARATUS FOR MANUFACTURING CELL CORE, AND CELL CORE

TECHNICAL FIELD

The present invention relates to a cell (battery) and a method for manufacturing the same, the cell being manufactured by: fabricating a laminated electrode member with sheet-shaped positive and negative electrodes and sheet-shaped separators interposed thereto to be arranged alternately with the electrodes; and winding the laminated electrode member around and along the circumferential surface of a core. The present invention also relates to a method and apparatus for manufacturing a cell core, and to a cell core.

BACKGROUND ART

Conventionally known examples of this type of cells include a cell formed of an oblong power generating element that is made by: forming a cylindrical core; winding sheet-shaped positive and negative electrodes around the core with sheet-shaped separators disposed between the positive and negative electrodes, thereby fabricating a cylindrical power generating element; and then pressing the cylindrical power generating element radially inward from both sides into an oblong shape (cf., Patent Document 1).

PRIOR ART DOCUMENT

Patent Document

Patent Document 1: Japanese Patent Application Laid-open No. 2003-242970

SUMMARY OF THE INVENTION

Problems to be Solved by the Invention

In the case of the above conventional cell, however, the power generating element is formed into an oblong shape from a cylindrical shape by being pressed from both sides, and thus the core itself too undergoes deformation into an oblong shape. Because of this, it is believed that strength relative to the pressing direction is decreased.

In view of the foregoing problem, the present invention provides cells that are inexpensive and have high strength, and methods for manufacturing the same, as well as methods and apparatus for manufacturing cell cores, and cell cores.

In order to solve the above problem, a method for manufacturing a cell of the present invention includes: a first step of manufacturing a core 20 using a core manufacturing apparatus, the apparatus including a pair of winding shafts 5, 5 that are disposed with a rotation center of the apparatus interposed therebetween, the pair of winding shafts 5, 5 revolving about the rotation center; and a second step of fabricating a laminated electrode member 25 with a sheet-shaped positive electrode 21, a sheet-shaped negative electrode 22 and sheet-shaped separators 23, 23, and winding the laminated electrode member 25 around a circumferential surface of the core 20, wherein the first step includes: inserting a sheet S having a higher strength than the separators between the winding shafts 5, 5; revolving the pair of winding shafts 5, 5 by a predetermined angle; and then, adhesively bonding or melt-bonding overlapped portions of the sheet S.

In this case, the sheet S is inserted between the two winding shafts 5, 5 and then fixed to the first winding shaft 5 at its end or a vicinity thereof, for example, and in this state, the pair of winding shafts 5, 5 are revolved by a predetermined angle to wind the sheet S, thereby manufacturing the core 20. Alternatively, the sheet S inserted between the two winding shafts 5, 5 may not be fixed to the winding shaft 5, for example, and in the unfixed state, the pair of winding shafts 5, 5 may be revolved by a predetermined angle to wind the sheet S to manufacture the core 20. In either case, the core 20 is provided having an oblong shape with curved portions projecting in different directions from each other, in which a portion of the sheet S extends diagonally across inside the annularly shaped portion of the sheet S. The thus made core 20 has high strength against a pressing force in the long and short axis directions. As such, the core 20 has a higher strength than the conventional core that is manufactured by pressing a cylindrical core to be deformed into an oblong shape (a shape having an oblong cross section).

In addition, the method of the present invention does not require significantly increasing production steps, with no need for complex steps, and thus is capable of manufacturing cells with a high yield rate easily and inexpensively. What is more, with this cell, it is possible to prevent or reduce deflection of positive and negative electrode plates which is caused by continuous use under high temperature, as well as to prevent or reduce the decrease in discharge capacity caused by the deflection.

Furthermore, the present invention may have a structure in which the separators 23, 23 are overlapped at one ends thereof and joined by adhesive bonding or melt bonding to the sheet S.

In this case, because of the structure in which the separators 23, 23 are joined to the core 20 at one ends thereof by adhesive bonding or melt bonding, the tension of the wound sheet S can be maintained. As a result, the strength of the core 20 is further enhanced.

The method for manufacturing a core 20 of the present invention includes using a core manufacturing apparatus, the apparatus including a pair of winding shafts 5, 5 that are disposed with a rotation center of the apparatus interposed therebetween, the pair of winding shafts 5, 5 revolving about the rotation center, the method including: inserting a sheet S between the winding shafts 5, 5; revolving the pair of winding shafts 5, 5 by a predetermined angle; and then, joining overlapped portions of the sheet S together by adhesive bonding or melt bonding.

In this case, the sheet S is inserted between the two winding shafts 5, 5 and then fixed to the first winding shaft 5 at its end or a vicinity thereof, for example, and in this state, the pair of winding shafts 5, 5 are orbitally moved at least one turn to wind the sheet S in one direction at the winding shafts 5, 5, thereby forming the core 20. Alternatively, the sheet S inserted between the two winding shafts 5, 5 may not be fixed to the first winding shaft 5 at its end or a vicinity thereof, for example, and in the unfixed state, the pair of winding shafts 5, 5 may be revolved to wind the sheet S in one direction at the winding shafts 5, 5 to form the core 20. In either case, the core 20 is provided having an oblong shape with curved portions projecting in different directions from each other, in which a portion of the sheet S extends diagonally across inside the annularly shaped portion of the sheet S. The thus formed core 20 has high strength against a pressing force in the long and short axis directions. As such, the core 20 has a higher strength than the conventional core that is manufactured by pressing a cylindrical core to be deformed into an oblong shape (a shape having an oblong cross section).

The core manufacturing apparatus of the present invention includes: a pair of winding shafts 5, 5 that are disposed with a rotation center of the apparatus interposed therebetween, the pair of winding shafts 5, 5 revolving about the rotation center; a sheet inserting member 10 that inserts a sheet S between the winding shafts 5, 5; and joining members 15, 15 that join overlapped portions of the sheet S together by adhesive bonding or melt bonding in a state where the pair of winding shafts 5, 5 has been revolved by a predetermined angle.

In this case, the apparatus can be constructed simply and inexpensively because it does not require any complicated mechanism to manufacture cores.

The core of the present invention is composed of a sheet S, the sheet S having a first end joined to a predetermined location of the sheet S and a second end joined to a different predetermined location of the sheet S, the sheet S having a portion extending between the two joining locations across inside an annularly shaped portion of the sheet S.

According to the present invention, the core may have a structure in which the inner side of the first end of the sheet S is joined to the outer side of the predetermined location of the sheet S, and the inner side of the second end of the sheet S is joined to the inner side of the different predetermined location of the sheet S, so that a portion of the sheet S extends between the two joining locations across inside the annularly shaped portion of the sheet S.

In this structure, curved portions are provided which project in different directions from each other and are of substantially the same size as each other, and a portion of the sheet S extends diagonally across inside the annularly shaped portion of the sheet S. Because of this structure, the strength of the core is enhanced.

According to the present invention, the core may have a structure in which the inner side of the first end of the sheet S is joined to the outer side of the predetermined location of the sheet S, and the outer side of the second end of the sheet S is joined to the inner side of the different predetermined location of the sheet S, so that a portion of the sheet S extends between the two joining locations across inside the annularly shaped portion of the sheet S.

In this structure, curved portions are provided which project in different directions from each other and are of substantially the same size as each other, and a portion of the sheet S is arranged inside the annularly shaped portion of the sheet S in such a manner as to form another curved portion therewithin. That is, the pair of curved portions that project in different directions together form the annularly shaped portion while one of the pair of curved portions and the curved portion formed inside the annularly shaped portion together form another annularly shaped portion. Thus, the strength of the core is enhanced by providing the three curved portions.

The cell of the present invention includes one of the above-described cores.

In this case, the cell is provided with one of the above-described cores, which makes it possible to prevent or reduce deflection of the positive and negative electrodes that is caused due to continuous use in a high temperature site or expansion and contraction of active materials caused by overcharge or the like, as well as to prevent or reduce the decrease in cell discharge capacity caused by the deflection. In other words, it is possible to provide a cell with significantly improved performance.

Advantages of the Invention

As described above, according to the present invention, the manufacture of a core is accomplished by: inserting between a pair of winding shafts a sheet to be made into the core; and then, revolving the pair of winding shafts by a predetermined angle. As such, it is possible to manufacture cells having high strength simply and inexpensively.

DETAILED DESCRIPTION OF THE PREFERRED EMBODIMENTS

Figure 1:
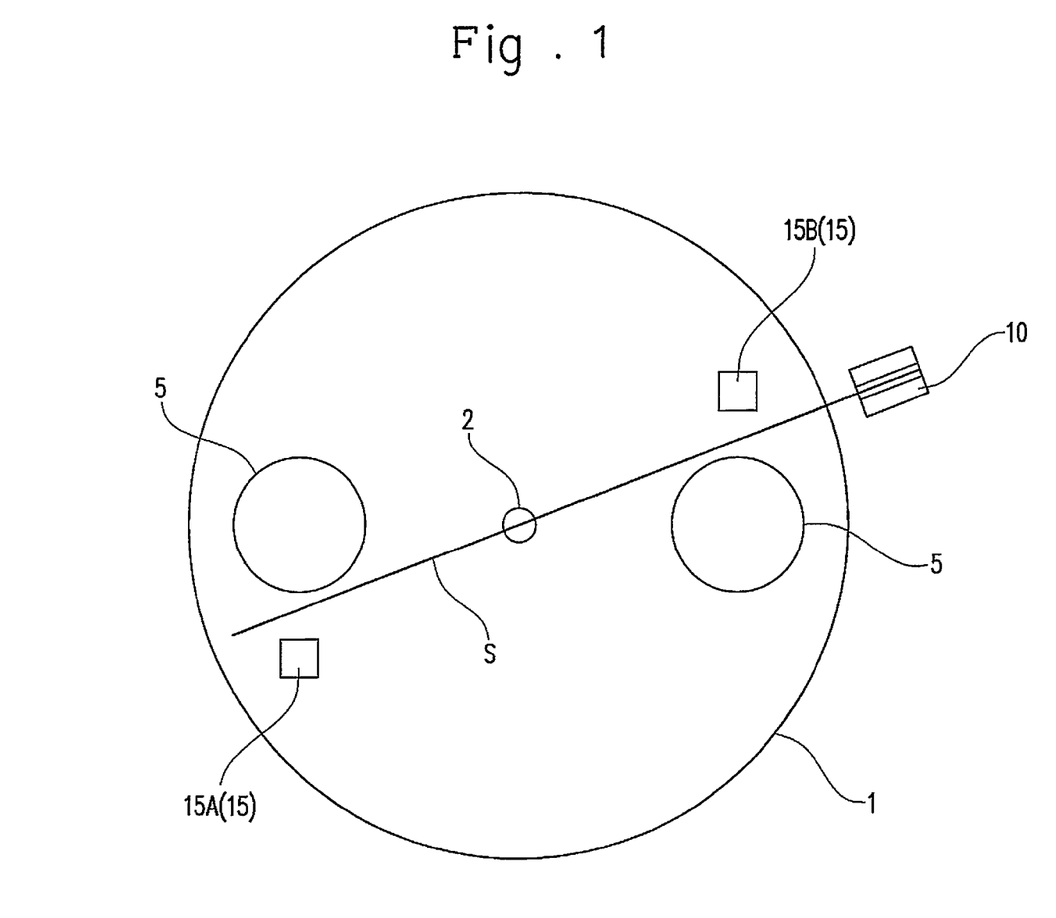
FIG. 1 is a plan view of an apparatus for manufacturing a cell according to an embodiment of the present invention, illustrating a state in which a sheet to be made into a core is inserted between a pair of winding shafts.

With reference to FIGS. 1-6, described below is a method for manufacturing a cell according to one embodiment of the present invention. Referring now to FIG. 1, a description is given of a core manufacturing apparatus for manufacturing a core of the cell. The core manufacturing apparatus includes: a table 1 that is rotatably disposed; a pair of winding shafts 5, 5 disposed with a rotation center of the table 1 interposed therebetween; a sheet inserting member 10 that inserts a resin sheet S between the winding shafts 5, 5; and chucks 15 (15A, 15B), as a fixing means and a melt-bonding means, which press and fix, and thermally melt-bond the inserted sheet S to the winding shafts 5, 5.

The table 1 has a disc shape, and a rotating shaft 2 is fixedly mounted at the center of the table 1. A pair of winding shafts 5, 5 are disposed at positions on both ends of a diameter passing through the rotating shaft 2 (at axisymmetric positions). In this embodiment, the table 1 is configured to turn counterclockwise.

The winding shafts 5, 5 are disposed close to the circumference of the table 1, and positioned horizontally in FIG. 1 as viewed from the front. The winding shafts 5, 5 are configured to orbitally move about the rotation center of the table at least one turn by the rotation of the table 1. As the winding shafts 5, 5 orbitally move, they wind up the sheet S inserted from the sheet inserting member 10 while applying tension to the sheet S.

The sheet inserting member 10 is disposed obliquely above the right side winding shaft 5 in FIG. 1 as viewed from the front. The sheet S is inserted from the downstream side of the rotational direction of the right side winding shaft 5 toward the downstream side of the rotational direction of the left side winding shaft 5.

The chucks 15A, 15B are each disposed on the downstream side of the corresponding respective winding shafts 5, 5. As described above, the chucks 15A, 15B are provided to be able to advance toward and retract from the winding shafts 5, 5, and each have a means for thermally melt-bonding the sheet S.

The sheet S may have a thickness of about 40-300 μm, for example, and may be made from any of polyethylene (PE), polypropylene (PP), polyphenylene sulfide (PPS), and polyethylene terephthalate (PET), for example.

Figure 2:
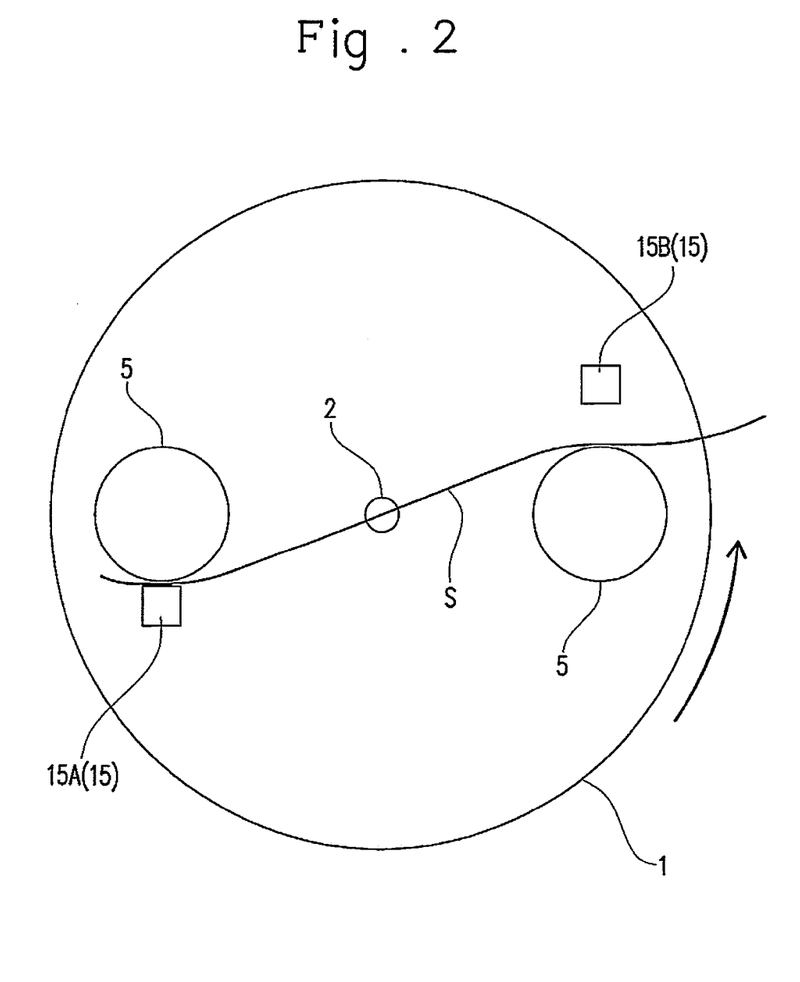
FIG. 2 is a plan view illustrating a state in which the inserted sheet is pressed and fixed to a first winding shaft.

With reference to FIGS. 1-8, described now is a method for manufacturing a cell according to this embodiment. Firstly, as shown in FIG. 1, the sheet S is inserted between the two winding shafts 5, 5 by the sheet inserting member 10. Then, as shown in FIG. 2, the first chuck 15A is advanced and moved to press and fix an end of the sheet S, so that the sheet S is brought into contact with the two winding shafts 5, 5. That is, while the front side of the sheet S is pressed and fixed to the downstream side surface of the first winding shaft 5, the back side of the sheet S is brought into contact with the downstream side surface of the second winding shaft 5. Thus, the sheet S is arranged diagonally between the two winding shafts 5, 5.

Figure 3:
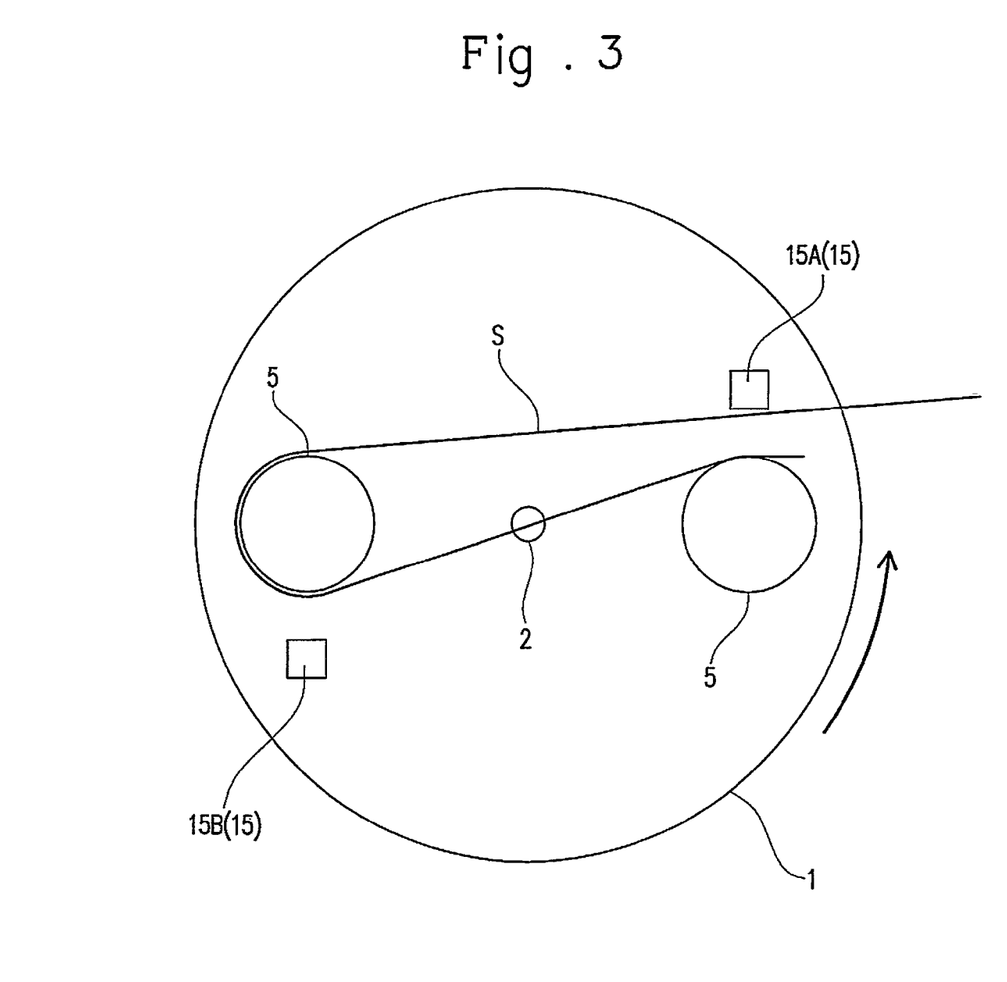
FIG. 3 is a plan view illustrating a table that has been rotated a half turn from the state of FIG. 2.
Figure 4:
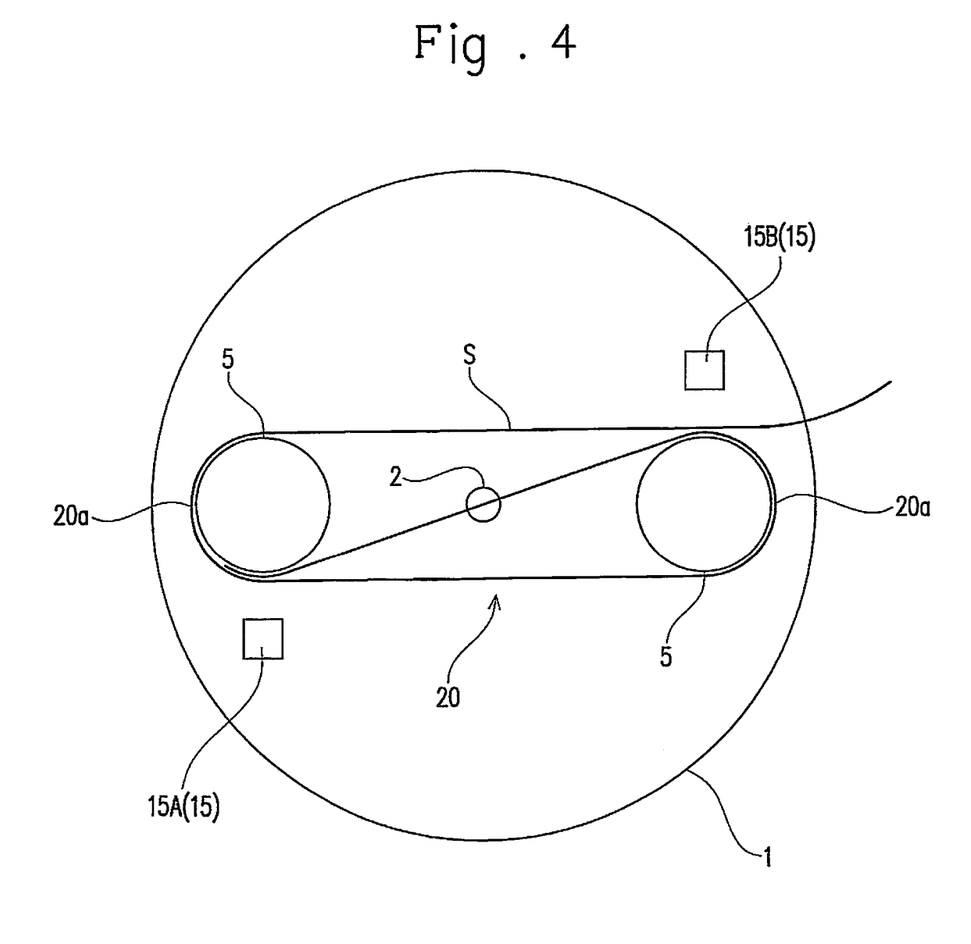
FIG. 4 is a plan view illustrating a state in which the table has been rotated another half turn to manufacture a core having a shape that looks like a flattened numeral "6."

From the state of FIG. 2, the table 1 is rotated a half turn counterclockwise, so as to allow the sheet S to be wound around and along the circumferential surface of the second winding shaft 5 as shown in FIG. 3. The first chuck 15A is configured to be movable (retractable), for example, in the rotational axis direction, so that the chuck 15A is not caught in the sheet S during the half turn motion. Furthermore, the table 1 is rotated another half turn counterclockwise, so as to allow the sheet S to be wound around and along the circumferential surface of the first winding shaft 5 as shown in FIG. 4. The second chuck 15B is configured to be movable (retractable), for example, in the rotational axis direction, so that the chuck 15B is not caught in the sheet S during the half turn motion.

When the sheet S has been wound around the two winding shafts 5, 5, the table 1 is stopped from rotating. Then, the chucks 15A, 15B are moved forward in the direction of the arrow (the direction toward the winding shafts 5, 5) to adhesively bond (or thermally melt-bond) respective curved portions of the sheet S, and the wound sheet S is cut at a portion close to a free end to thereby provide the core 20. In this embodiment, the table 1 is rotated one turn, but alternatively it may be rotated two or three turns.

Figure 7A:
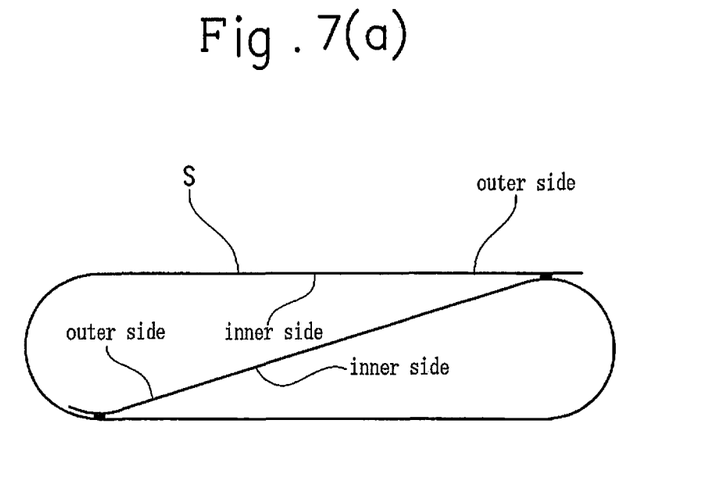
FIG. 7(a) is a schematic view of the core according to this embodiment.

As shown in FIG. 7(a), the core 20 is configured in such a manner that the inner side of a first end of the sheet S is joined to the outer side of a predetermined location of the sheet S, and the inner side of the second end of the sheet S is joined to the inner side of a different predetermined location of the sheet S. Thus, the core 20 has a shape that looks like the numeral "6" being flattened by pressure applied in the direction crossing the surface of the sheet S. Further, the core 20 has curved portions 20a, 20a that project in different directions from each other and are of substantially the same size as each other, as well as having the portion of the sheet S extending diagonally across inside the annularly shaped portion of the sheet S. Because of this structure, the strength of the core is enhanced.

Figure 5:
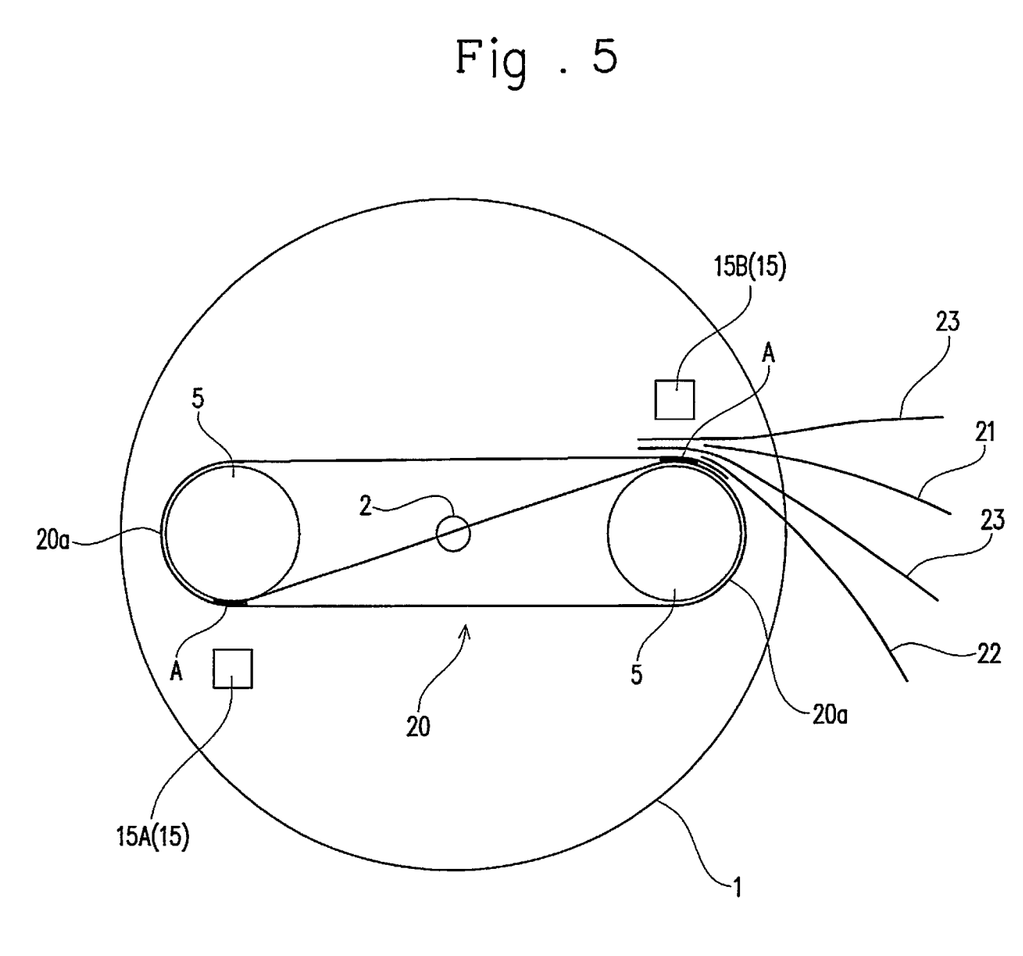
FIG. 5 is a plan view illustrating a state in which sheet-shaped separators are interposed to sheet-shaped positive and negative electrodes to be arranged alternately with the electrodes, thereby fabricating a laminated electrode member.

Thereafter, as shown in FIG. 5, a pair of sheet-shaped separators 23, 23 are fed out by an unshown feeder, and overlapped at one ends thereof and joined to the joining location A of the core 20. Thus, the tension of the wound sheet S is maintained. In other words, tensile force constantly acts in the outward direction so as to maintain the oblong shape, thereby further enhancing the strength of the core 20.

Thereafter, positive and negative electrodes 21, 22 are fed in such a manner that the separator 23, 23 are interposed to the positive electrode 21 and the negative electrode 22 to be arranged alternately with the electrodes. In this state, the table 1 is rotated again so that the two electrodes 21, 22 and separators 23 are wound and formed into a laminated electrode member 25, and then, the table 1 is rotated several turns to wind the laminated electrode member 25 around and along the circumferential surface of the core 20, thereby manufacturing the cell 30 (cf., FIG. 6).

The separators 23 each may have a thickness of about 20-30 μm, for example, and may be made from either polyethylene or polypropylene, for example.

Figure 6:
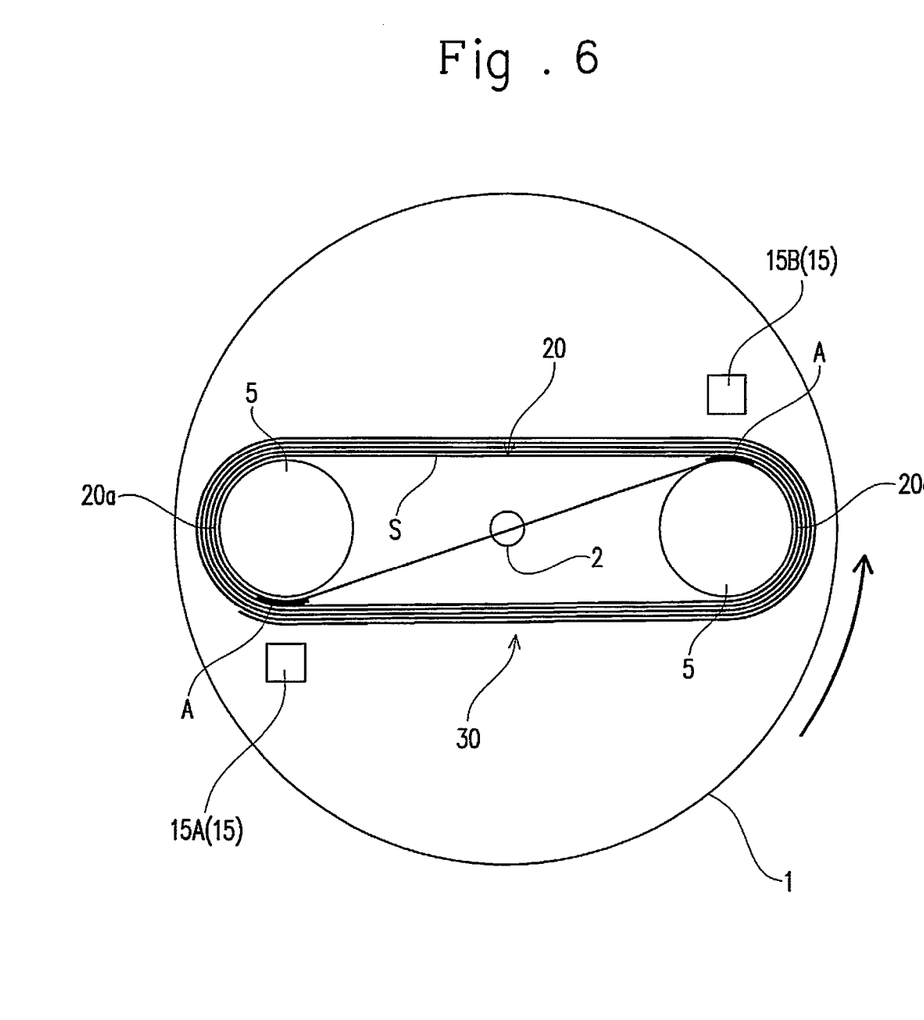
FIG. 6 is a plan view illustrating a state in which the laminated electrode member is wound around and along the circumferential surface of the core to manufacture a cell.

As described above, the thus manufactured cell 30 is provided with the core 20 that has curved portions 20a, 20a projecting in different directions from each other, which imparts to the cell 30 high strength against inward pressure applied in the long axis direction of the core 20. At the same time, the cell 30 is provided with the portion of the sheet S that extends diagonally between the joining locations A, A across inside the annularly shaped portion of the sheet S, which imparts to the cell 30 high strength against inward pressure applied in the short axis direction of the core 20. That is, the cell 30 is manufactured ensuring high strength regardless of pressure applied in either direction.

Figure 8A:
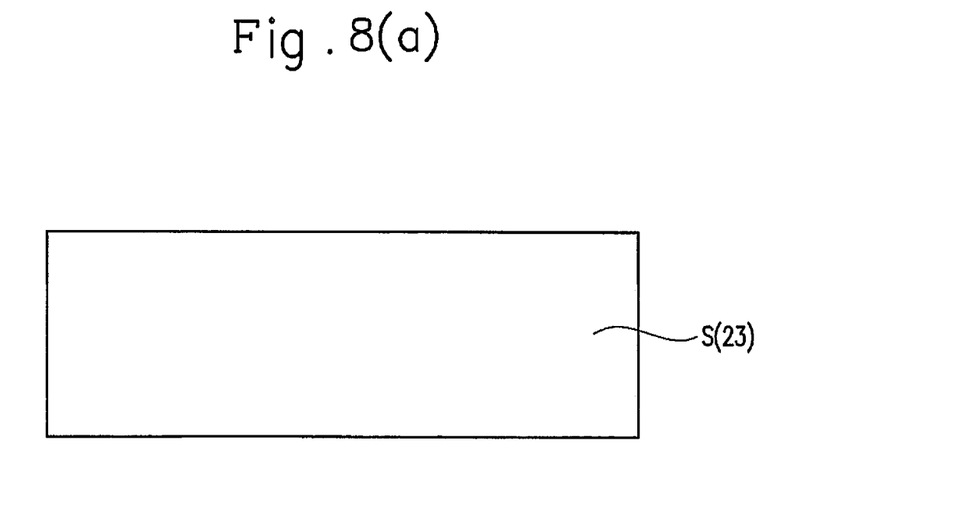
FIG. 8(a) is a plan view of a sample that is used in strength tests.
Figure 8B:
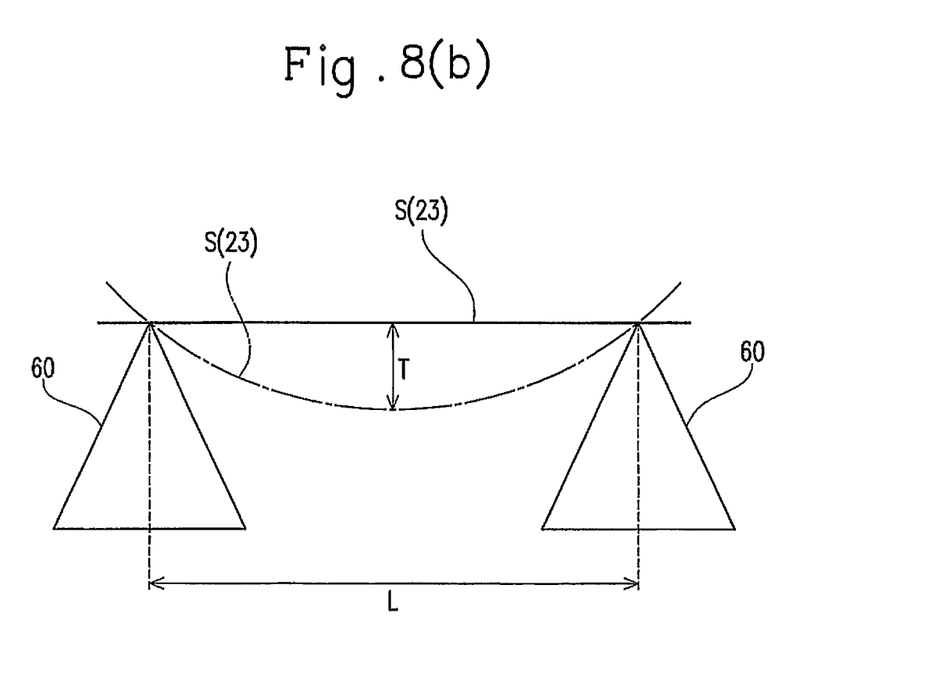
FIG. 8(b) is a view illustrating an example of a testing apparatus.

The strengths of the sheet S and the separator S are now described with reference to FIG. 8. Rectangular samples as shown in FIG. 8(a) are prepared for the sheet S and the separator 23, and strength tests are carried out using a testing apparatus shown in FIG. 8(b). Specifically, a pair of supports 60, 60 having a triangular cross section are arranged with a predetermined distance L therebetween, and each sample is placed horizontally on the tops of the supports 60, 60. In this state, the amount of deflection T is determined by finding out the extents to which the sheet S and the separator 23 are bent, and a sample that has a smaller amount of deflection T is referred to as having higher strength. It is to be noted that the present invention requires the sheet S have higher strength (have a smaller amount of deflection) than the separator 23.

With the cell 30, even under continuous use at high temperature, it is possible to prevent or reduce deflection of the positive and negative electrodes that is caused due to expansion and contraction of active materials, as well as to prevent or reduce the decrease in cell discharge capacity caused by the deflection. In other words, significant improvement in performance is observed.

Figure 7B:
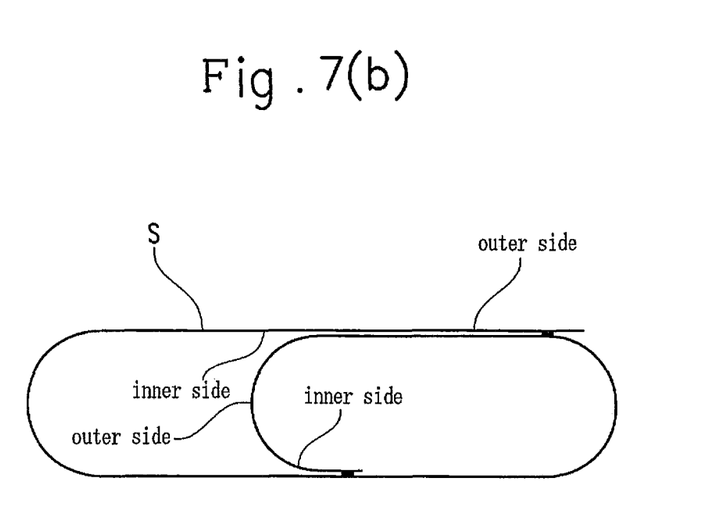
FIG. 7(b) is a schematic view illustrating another embodiment of the core of the present invention.

In the case of the above-described embodiment, the core is configured in such a manner that the inner side of the first end of the sheet S is joined to the outer side of the predetermined location of the sheet S, and the inner side of the second end of the sheet S is joined to the inner side of the different predetermined location of the sheet S (cf., FIG. 7(a)). Alternatively, as shown in FIG. 7(b), the core may be configured in such a manner that the inner side of the first end of the sheet S is joined to the outer side of the predetermined location of the sheet S, and the outer side of the second end of the sheet S is joined to the inner side of the different predetermined location of the sheet S.

Figure 9:
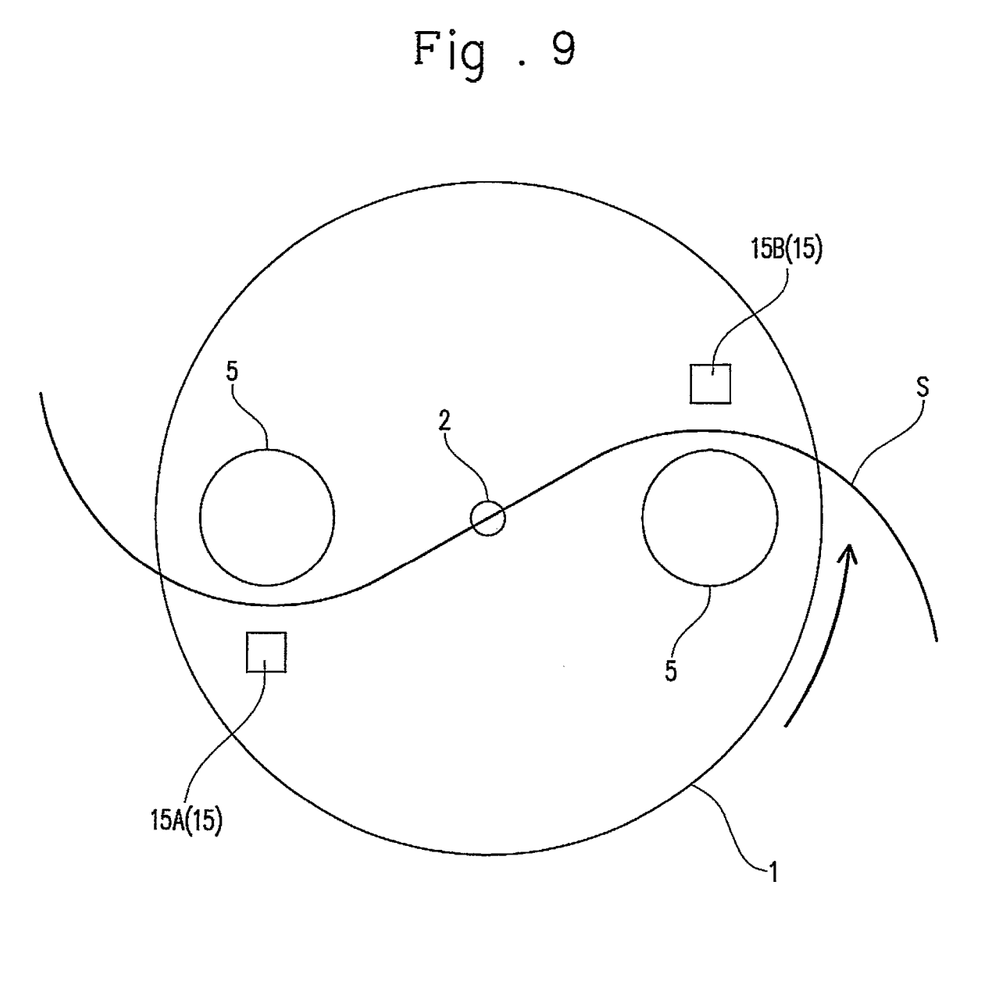
FIG. 9 is a plan view illustrating another method for manufacturing a cell.
Figure 11:
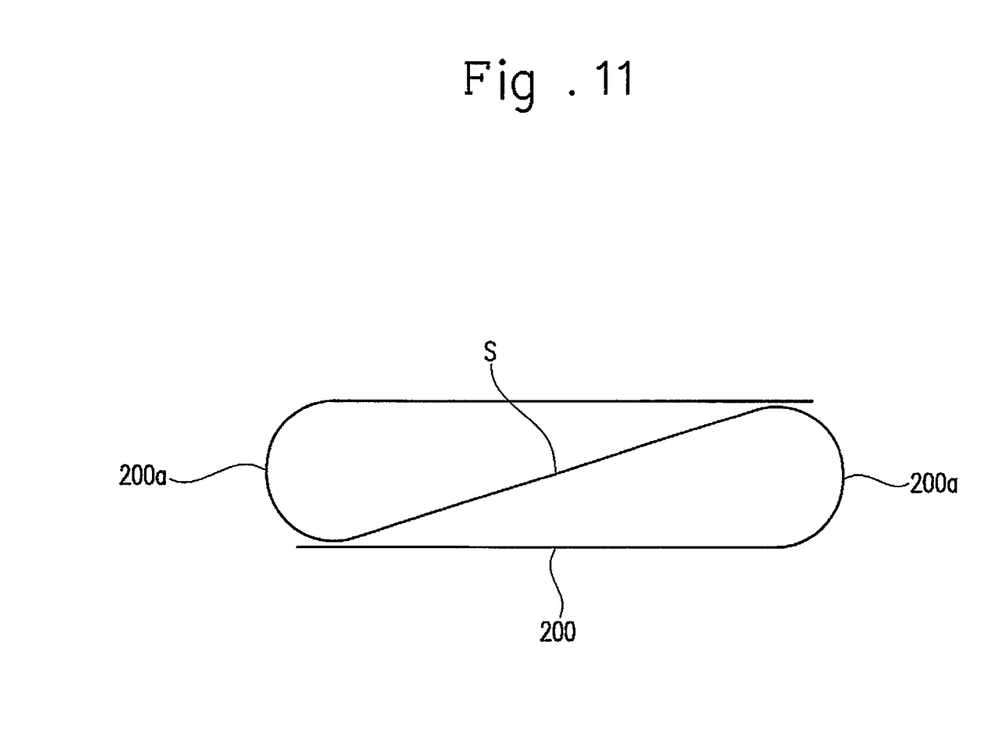
FIG. 11 is a plan view illustrating a core having a shape that looks like a flattened letter "S" or flattened numeral "8."

In the above embodiment, the sheet S is wound up in such a manner that the sheet S is inserted between the two winding shafts 5, 5 and then pressed and fixed at its end to the first winding shaft 5, and in this state, the table 1 is rotated while the second winding shaft 5 is pressed onto the back side of the sheet S. Alternatively, as shown in FIG. 9, the sheet S may be wound up in such a manner that the sheet S is inserted between the two winding shafts 5, 5 and pressed, with the first winding shaft 5 pressing the front side of the sheet S and the second winding shaft 5 pressing the back side of the sheet S, and in this state, the table 1 is rotated at least a half turn, for example, to form the sheet S into a shape that looks like the letter "S" or numeral "8" being flattened by pressure applied in the vertical direction (cf., FIG. 11). In this case, the sheet S is wound in one direction at the two winding shafts 5, 5 to form a core 200 having at both sides curved portions 200*a*, 200*a* that are of substantially the same shape. The thus formed core 200 has the two curved portions 200*a*, 200*a* projecting in different directions from each other, as well as having a linear portion, extending between the two curved portions 200*a*, 200*a*, which links with the opposite side ends of the respective curved portions 200*a*, 200*a*. Accordingly, as with the above-described embodiment, it is possible to increase strength against external pressure and to prevent or reduce the deflection of electrode plates. Alternatively, in this case, the winding shafts 5, 5 may be controlled to be driven independently of each other so that the first winding shaft 5 presses the front side of the sheet S and the second winding shaft 5 presses the back side of the sheet S.

Figure 10:
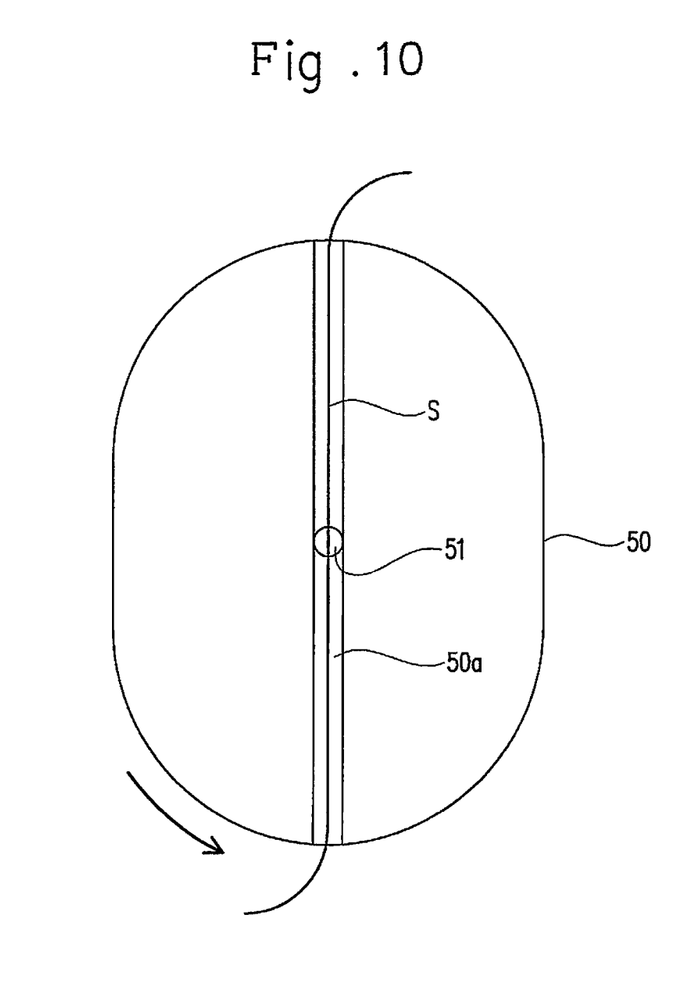
FIG. 10 is a plan view illustrating another embodiment of the core manufacturing apparatus.

Furthermore, in the above embodiment, the pair of winding shafts 5, 5 are provided which are disposed with the rotation center of the table 1 interposed therebetween. Alternatively, as shown in FIG. 10, a single oblong winding shaft 50 may be rotatably provided, in which a groove 50*a* is formed along the long axis direction of the winding shaft 50, so that the sheet S is inserted in the groove 50*a* and the table 1 is rotated in such a state. This embodiment also provides the core 200*a* as shown in FIG. 9. The numeral 51 in FIG. 10 denotes a rotating shaft.

Furthermore, in the above embodiment, thermal melt bonding is employed to join portions of the sheet S, but alternatively joining by the use of either a hot melt adhesive or a tape adhesive may be employed.

Furthermore, the description of the above embodiment is directed to cores used in cells, but the above embodiment may provide cores for use in other applications as well as in cells.

DESCRIPTION OF REFERENCE CODES

1: table, 2, 51: rotating shaft, 5, 50: winding shaft, 10: sheet inserting member, 15: chuck, 20, 200: core, 20*a*, 200*a*: curved portion, 21: positive electrode, 22: negative electrode, 23: separator, 25: laminated electrode member, 30: cell, 50*a*: groove, 60: support, A: joining location, L: distance, P: sample, T: amount of deflection, S: sheet

The invention claimed is:

1. A core comprising a sheet, the sheet having a first end joined to a first location of the sheet and a second end joined to a second location of the sheet, the sheet comprising an annularly shaped portion, in which the first location and the second location are located separately, and a portion extending between the first location and the second location, the portion crossing inside the annularly shaped portion.

2. The core according to claim 1, wherein an inner side of the first end of the sheet is joined to an outer side of the first location of the sheet, and an inner side of the second end of the sheet is joined to an inner side of the second location of the sheet.

3. The core according to claim 1, wherein an inner side of the first end of the sheet is joined to an outer side of the first location of the sheet, and an outer side of the second end of the sheet is joined to an inner side of the second location of the sheet.

4. The core according to claim 1, wherein the annularly shaped portion has two curved portions and a linear portion which extends between the two curved portions.

5. A cell comprising a core which comprises a sheet, the sheet having a first end joined to a first location of the sheet and a second end joined to a second location of the sheet, the sheet comprising an annularly shaped portion, in which the first location and the second location are located separately, and a portion extending between the first location and the second location, the portion crossing inside the annularly shaped portion.

6. The cell according to claim 5, wherein an inner side of the first end of the sheet is joined to an outer side of the first location of the sheet, and an inner side of the second end of the sheet is joined to an inner side of the second location of the sheet.

7. The cell according to claim 5, wherein an inner side of the first end of the sheet is joined to an outer side of the first location of the sheet, and an outer side of the second end of the sheet is joined to an inner side of the second location of the sheet.

8. The cell according to claim 5, wherein the annularly shaped portion has two curved portions and a linear portion which extends between the two curved portions.

* * * * *